US009499135B2

(12) United States Patent
Belanger et al.

(10) Patent No.: US 9,499,135 B2
(45) Date of Patent: Nov. 22, 2016

(54) LIGHTED VEHICLE WASH COMPONENT

(71) Applicants: Michael J. Belanger, Northville, MI (US); Barry S. Turner, Novi, MI (US); Curtis S. Prater, Warren, MI (US); Michael S. Sayyae, Westland, MI (US); Mark D. Morin, Plymouth, MI (US)

(72) Inventors: Michael J. Belanger, Northville, MI (US); Barry S. Turner, Novi, MI (US); Curtis S. Prater, Warren, MI (US); Michael S. Sayyae, Westland, MI (US); Mark D. Morin, Plymouth, MI (US)

(73) Assignee: Belanger, Inc., Northville, MI (US)

(*) Notice: Subject to any disclaimer, the term of this patent is extended or adjusted under 35 U.S.C. 154(b) by 245 days.

(21) Appl. No.: 14/456,636

(22) Filed: Aug. 11, 2014

(65) Prior Publication Data

US 2014/0345071 A1 Nov. 27, 2014

Related U.S. Application Data

(63) Continuation-in-part of application No. 13/668,093, filed on Nov. 2, 2012, now Pat. No. 8,819,887.

(60) Provisional application No. 61/554,559, filed on Nov. 2, 2011, provisional application No. 61/556,893, filed on Nov. 8, 2011, provisional application No. 61/642,831, filed on May 4, 2012.

(51) Int. Cl.
*A46B 13/00* (2006.01)
*B60S 3/06* (2006.01)

(52) U.S. Cl.
CPC ............... *B60S 3/06* (2013.01); *A46B 13/001* (2013.01); *A46B 13/003* (2013.01); *B60S 3/066* (2013.01); *A46B 2200/3046* (2013.01)

(58) Field of Classification Search
CPC .......... B60S 3/06; B60S 3/063; B60S 3/066; A46B 3/08; A46B 3/10; A46B 3/14; A46B 7/10; A46B 13/00; A46B 13/001; A46B 13/003; A46B 13/005; A46B 13/006; A46B 13/02; A46B 15/00; A46B 15/0055; A46B 2200/3046
USPC ........... 15/4, 53.1–53.4, 97.3, 179, 181–183, 15/230, 230.14, 230.16, 230.18, 230.19
See application file for complete search history.

(56) References Cited

U.S. PATENT DOCUMENTS

| 5,784,748 A | * | 7/1998 | Belanger | ............... A46B 13/003 15/230.14 |
| 2009/0250993 A1 | * | 10/2009 | Vivyan | ............... A46B 13/003 300/21 |

* cited by examiner

*Primary Examiner* — Mark Spisich
(74) *Attorney, Agent, or Firm* — John S. Artz; Dickinson Wright, PLLC

(57) ABSTRACT

A vehicle wash component includes a rotatable hub portion having an outer surface and an axis of rotation. The rotatable hub portion is in driving communication with at least one core portion to effectuate rotation thereof. At least one media element is fixedly secured to the at least one core portion for rotation therewith. The media element includes a plurality of upstanding finger portions, which are configured to contact an exterior surface of a vehicle. The core portion includes at least one light retaining aperture formed therein. At least one illumination element is disposed between the plurality of upstanding finger portions and in the at least one light retaining aperture so that it rotates as the at least one core portion rotates and can be seen by a vehicle occupant.

19 Claims, 7 Drawing Sheets

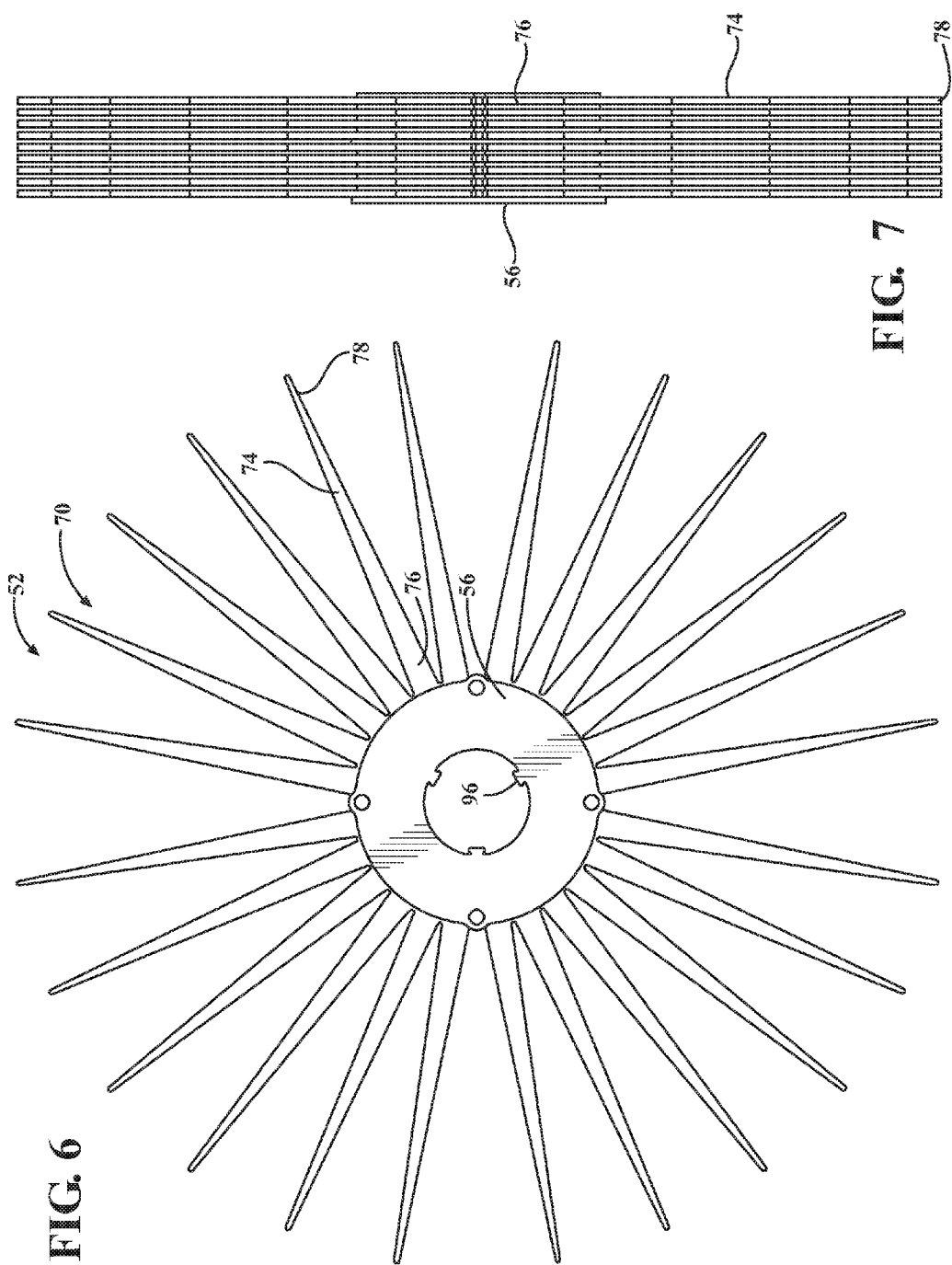

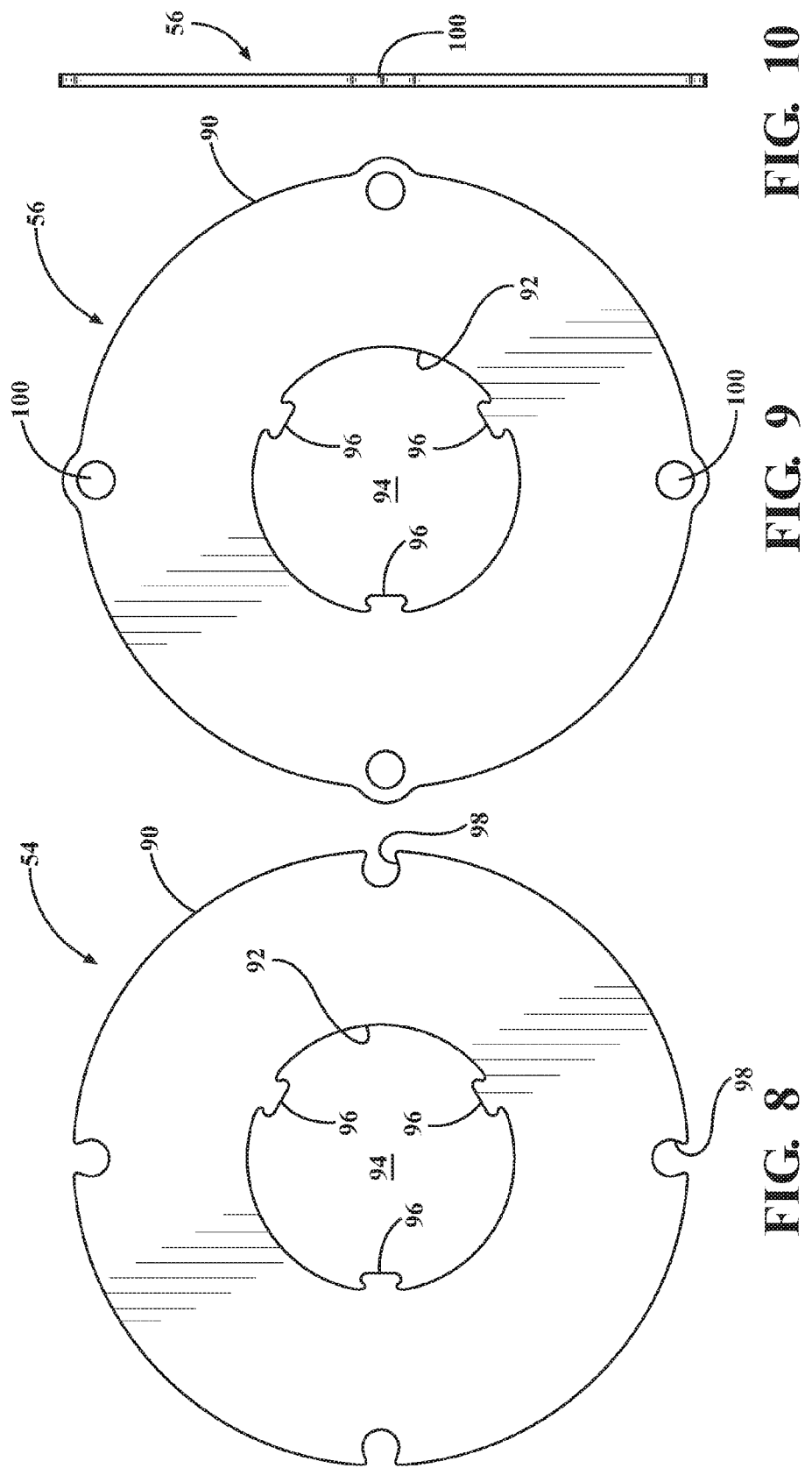

LIGHTED VEHICLE WASH COMPONENT

CROSS-REFERENCE TO RELATED APPLICATIONS

The present application is a continuation-in-part of U.S. patent application Ser. No. 13/668,093, entitled "Illuminated Hub for a Vehicle Wash Component", which was filed on Nov. 2, 2012, now U.S. Pat. No. 8,819,887, which claims priority to U.S. Provisional Patent Application Ser. No. 61/554,559, entitled "Car Wash Implement and Splayable Foam Plastic Element for Use in Constructing Same", which was filed on Nov. 2, 2011; U.S. Provisional Patent Application Ser. No. 61/556,893, entitled "Injection Molded Foamed Polymeric Car Wash Media", which was filed on Nov. 8, 2011; and U.S. Provisional Patent Application Ser. No. 61/642,831, entitled "Top Brush", which was tiled on May 4, 2012, the disclosures of which are all hereby incorporated by reference as though set forth folly herein.

TECHNICAL FIELD

The present disclosure relates generally to a vehicle wash component for use in cleaning a vehicle exterior in a vehicle wash facility. More specifically, the present disclosure relates to a lighted vehicle wash component for cleaning a vehicle exterior in a vehicle wash facility that yields enhanced aesthetics.

BACKGROUND OF THE DISCLOSURE

Vehicle wash facilities generally are known to have dark and dirty environments, which can make them unattractive to customers and potential customers. This environment results, in part, from the fact that current rotary brush components generally employ a cylindrical central hub design that is densely populated with a plurality of washing elements such that even the hub is not visible. This densely populated hub also serves to block a great deal of light to a vehicle occupant as the wash component approaches the vehicle during the vehicle wash process. This can result in a significant darkening of the vehicle interior and an unpleasant wash experience, Combine this darkness with windshields and side windows that are often covered with soapy water and visibility within current vehicle wash facilities is very low.

Consequently, some wash owners have made an attempt to brighten this environment and enhance a user's wash experience though the use of lighted arches and signs, which can create somewhat of a "carnival" feel. Many vehicle wash facilities also employ lights and lighted signs as a way to advertise extra services like tire shine, sealer wax, and triple foam as well as to drive traffic to and create more revenue for their vehicle wash facility. While these lighted arches and lighted signs may be effective in drawing consumer attention to the wash or the extra services, the lighting is very selective and does little to improve the overall environment within the vehicle wash facility. This is because the rotary brush components would block a vehicle occupant from seeing these lights during the vehicle wash process. These lights therefore do not assist in making the vehicle wash process less intimidating.

Another disadvantage of current vehicle wash configurations is that they share a largely similar, utilitarian appearance that makes it correspondingly difficult for wash owners to provide a distinctive or memorable service offering to their customers, Lighted arches and signs do little to overcome this problem as any attempted branding created thereby is obstructed to vehicle occupants during the wash process.

It would thus be desirable to provide a vehicle wash component that addresses these issues.

SUMMARY OF THE DISCLOSURE

It is therefore an aspect of the present disclosure to provide a lighted vehicle wash component that yields unproved aesthetics within the vehicle wash facility.

It is another aspect of the present disclosure to provide a lighted vehicle wash component that enhances a customer's experience during the wash process, It is a further aspect of the present disclosure to provide a lighted vehicle wash component that can help create brand recognition for a vehicle wash facility.

It is a still another aspect of the present disclosure to provide a lighted vehicle wash component that can brighten the environment within a vehicle wash facility.

It is yet another aspect of the present disclosure to provide a lighted vehicle wash component that yields enhanced brightness and aesthetics for a vehicle wash facility when the wash component is at rest.

In accordance with the above and the other aspects of the present disclosure, a lighted vehicle wash component is provided. The vehicle wash component includes a rotatable hub portion having an outer surface and an axis of rotation. The rotatable hub portion is in driving communication with at least one core portion to effectuate its rotation. At least one media element is fixedly secured to the at least one core portion with the at least one media element including a plurality of upstanding finger portions, which are configured to contact an exterior surface of a vehicle. The at least one core portion includes at least one light retaining aperture formed therein. The component includes at least one illumination element disposed between the plurality of upstanding finger portions and in the at least one light retaining aperture so that it rotates as the at least one core portion rotates.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 6 is a front view of the exemplary media segment of FIG. 5;

FIG. 7 is a side view of the exemplary wash media segment of FIG. 5;

FIG. 8 is a front view of a core portion of a lighted vehicle wash component in accordance with an aspect of the disclosure;

FIG. 9 is a front view of another core portion of a lighted vehicle wash component in accordance with an aspect of the disclosure; and FIG. 10 is a side view of the core portion of FIG. 9.

DETAILED DESCRIPTION OF THE DISCLOSURE

Figure 1:
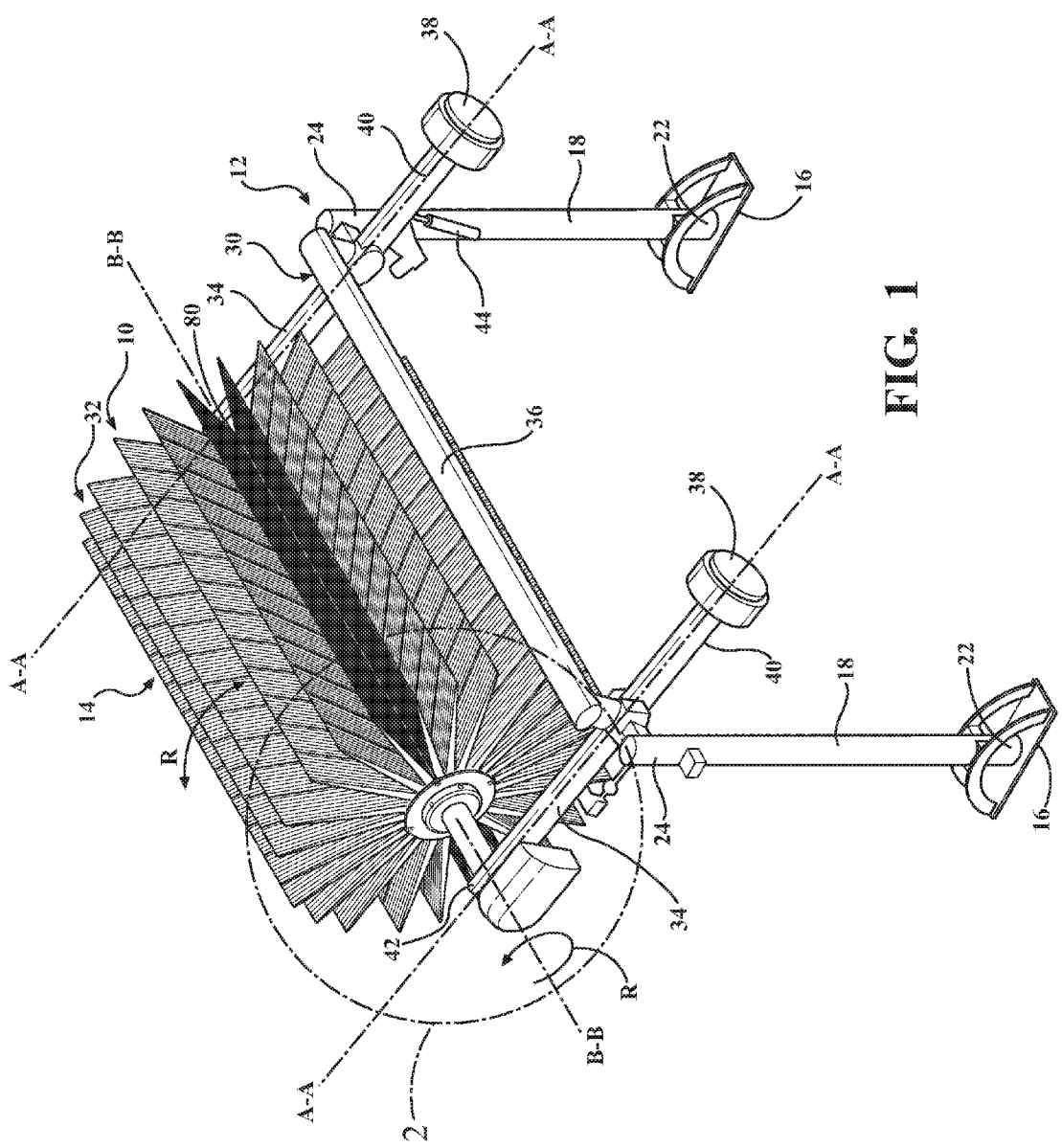
FIG. 1 is perspective view of a lighted vehicle wash component in accordance with an aspect of the disclosure.

According to an aspect, the present disclosure relates to a treatment component for a vehicle wash system. The vehicle wash system may be configured as a tunnel car wash where a vehicle is conveyed through the wash process by a conveyor or the like as is known in the art. Alternatively, the vehicle wash system may be configured as a roll-over type where the vehicle remains stationary and the various treatment components may be translated and/or moved with respect to the vehicle to perform the vehicle wash process. Other suitable wash processes and systems may also be employed as are known. According to an aspect, the vehicle wash system may be housed within a vehicle wash facility having an entrance end where a vehicle enters, an exit end where the vehicle leaves, and a vehicle treatment area where the vehicle is cleaned. It will be appreciated that the disclosed treatment component could also be employed in connection with a variety of other applications outside. of a vehicle wash system, such as a manual or self-serve wash process.

According to a further aspect, an exemplary vehicle wash system into which the disclosed component may be incorporated can include a plurality of vehicle wash components that engage and/or treat the exterior of a vehicle as it passes through the vehicle wash facility to effectuate a vehicle wash process. For example, the components can include a rinse arch, which sprays water onto a vehicle to wet the exterior surface for further processing. Another component can include a bubble device that generates bubbles and emits them directly onto a vehicle exterior in order to provide a supply of soap for cleaning purposes. An exemplary bubble device that may be employed with the disclosed system is disclosed in Applicant's co-pending U.S. patent application Ser. No. 13/864,813, entitled "A Vehicle Wash Component for Emitting Bubbles", filed Apr. 17, 2013, the disclosure of which is hereby incorporated by reference. Other suitable devices for generating bubbles or foam may also be employed. Other components may include one or more top brushes for contacting a top exterior surface of a vehicle, a plurality of side brushes for contacting side exterior surfaces of a vehicle and a plurality of wrap brushes for contacting front and back surfaces of a vehicle. Another component may include wheel scrubbers for engaging vehicle wheels. A further component that may be employed can include a drying apparatus for removing water from the vehicle exterior. According to a further aspect, the system can include a wheel polishing device for treating vehicle wheels.

It will be appreciated that more, less or different wash components may be employed. Additionally, multiples of the same components may be employed as part of the system, as desired, Further, the components may take on a variety of different configurations. Moreover, the order, placement and sequence of the components within the system may also vary, According to an aspect, the components may be designed to engage and/or treat a vehicle disposed within the vehicle treatment area of the vehicle wash facility.

According to an aspect, the present disclosure relates to a lighted vehicle wash component 10 for treating an exterior surface of a vehicle, such as a painted surface, However, it can treat other vehicle surfaces. With reference to FIG. 1, the vehicle wash component 10 may be a top brush configured to contact a top surface of a vehicle. It will be appreciated that other types of brushes, such as side brushes, may also be employed. According to an aspect, the vehicle wash component 10 may broadly consist of a frame 12 and a brush portion 14 supported by the frame 12. The component 10 can be particularly suited for use in vehicle wash applications so that while it is being rotated by a suitable power source, such as a motor, it can be brought into contact with the exterior surface of a vehicle to perform a scrubbing or cleaning function to remove dirt or debris therefrom. It will be appreciated that the disclosed top brush can also perform other functions besides cleaning.

According to an aspect, the frame 12 can generally include a pair of baseplate portions 16 and a pair of vertical supports 18. It will be appreciated that the frame 12 may consist of more or less components. In accordance with another aspect, the components of the frame 12 may be constructed of a metal material and may be powder-coated to resist against corrosion. Alternatively, the components of the frame 12 may be constructed of a plastic or other suitable non-metal material. All or portions of the frame 12 could alternatively be formed as a single integral structure. It will be appreciated that the frame 12 could be mounted in a variety of other suitable ways, including to the walls or the ceiling of the wash facility.

According to an aspect, the baseplate portions 16 may be mounted to a floor of the vehicle wash facility. The baseplate portions 16 may each be configured as a generally flat structure for engaging a flat surface, such as a floor. The vertical supports 18 of the frame 12 may extend generally upward from a respective baseplate portion 16 and can include a lower end 22 secured to a respective baseplate portion 16 and an upper end 24 disposed remotely from the baseplate portion 16. The vertical supports 18 may be preferably spaced far enough apart to permit a vehicle to pass therebetween. In other words, the vertical support 18 may be disposed on opposite sides of the vehicle treatment area. As shown, the vertical supports 18 may be oriented generally perpendicular to the baseplate portions 16. However, it should be appreciated that the vertical supports 18 may extend at different angles from the baseplate portion 1$. It will he appreciated that the baseplate portions 16 and the vertical supports 18 can have a variety of different configurations.

According to an aspect, the brush portion 14 may include a u-shaped counterbalance frame 30 for supporting a brush assembly 32. According to a further aspect, the u-shaped frame 30 may be pivotally connected to the frame 12 and can include a pair of pivotal arm portions 34 and a cross-support arm 36 that may extend between the pivotal arm portions 34. Pursuant to a further aspect, a counterbalance weight 38 may be secured to a second end 40 of each of the arm portions 34 to allow pivotal rotation of the arms about an axis A-A so as to raise and lower the brush assembly 32 mounted on the cross-support arm 36 between first ends 42 of the pivotal arm portions 34. The brush assembly 32 may be driven in rotation about an axis B-B in the direction of the arrow R by a suitable control mechanism as dictated by a control system. A suitable control system can include a computer with a processor and suitable memory for storing encoded logic and executing same based on certain programmed criteria. In operation, the brush assembly 32 may be moved between a vehicle engaging position and a retracted position under computer control by actuating cylinders 44, such as hydraulic or pneumatic cylinders, which can extend between the pivotal arm portions 34 and the vertical supports 18. According to another aspect, the brush assembly 32 may be moved and controlled in a variety of other suitable ways. In accordance with an aspect, a drive mechanism 46 may be in communication with the brush assembly 32 to cause rotation thereof at predetermined speeds in the direction R. The motor can also be operated by the control system.

With reference to the FIGs, the brush assembly 32 may generally include a hub portion 50, a plurality of wash media segments 52, and a plurality of core portions 54, 56, According to an aspect, the brush assembly 32 may have a generally cylindrical configuration. Alternatively, the brush assembly 32 may be shaped in a variety of different ways, including tapered or hourglass configurations. It will be appreciated that the brush assembly 32 and/or similar implements may be used not only in conveyer washes, but also in the so-called rollover washers where the vehicle is stationary and the brushes are mounted to a gantry or the like which can move back and forth relative to a vehicle. The brush assembly 32 may be used in connection with a side brush, a top brush or other rotating component, as discussed above.

Figure 2:
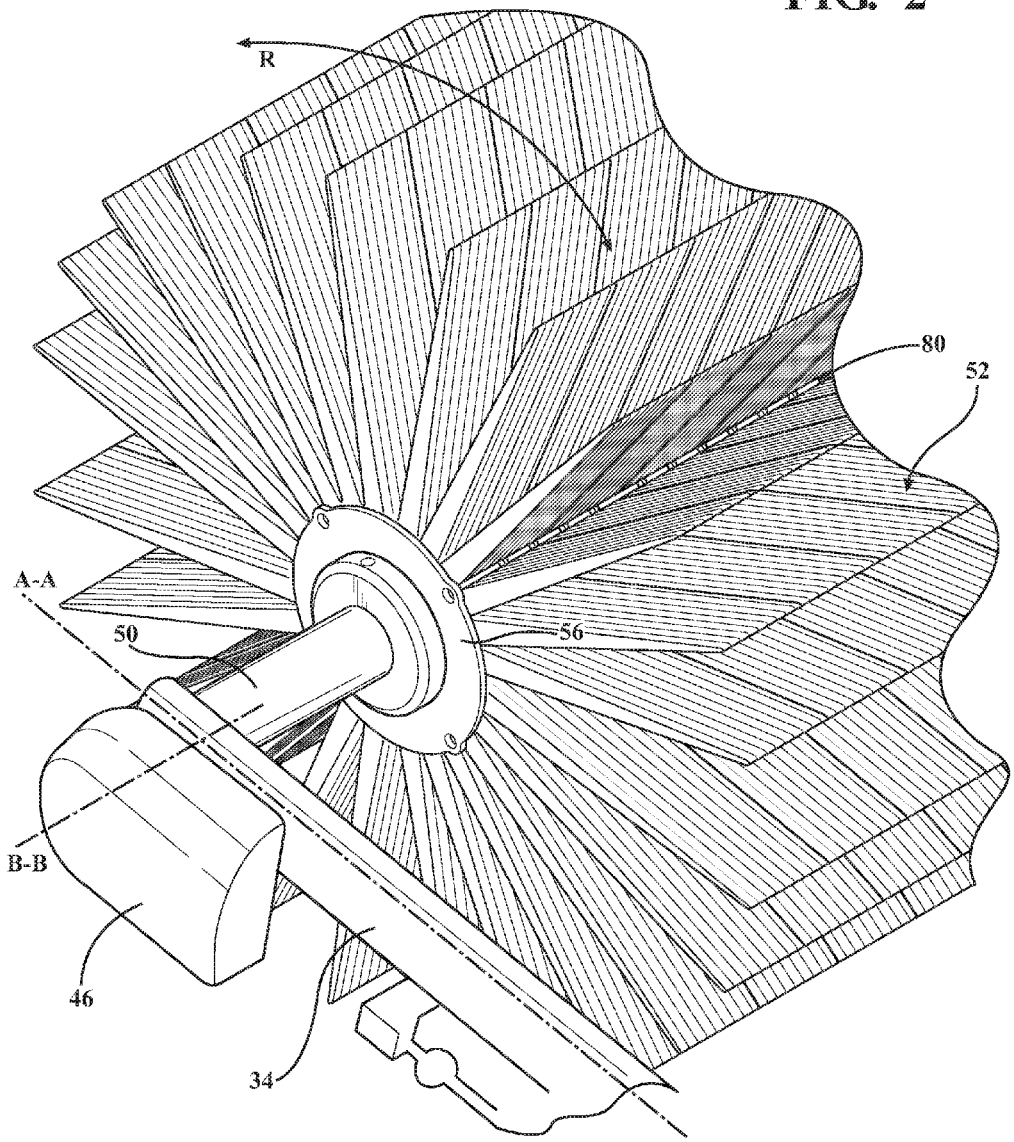
FIG. 2 is an enlarged view of portion of the lighted vehicle wash component within the circle labeled 2 in FIG. 1.
Figure 3:
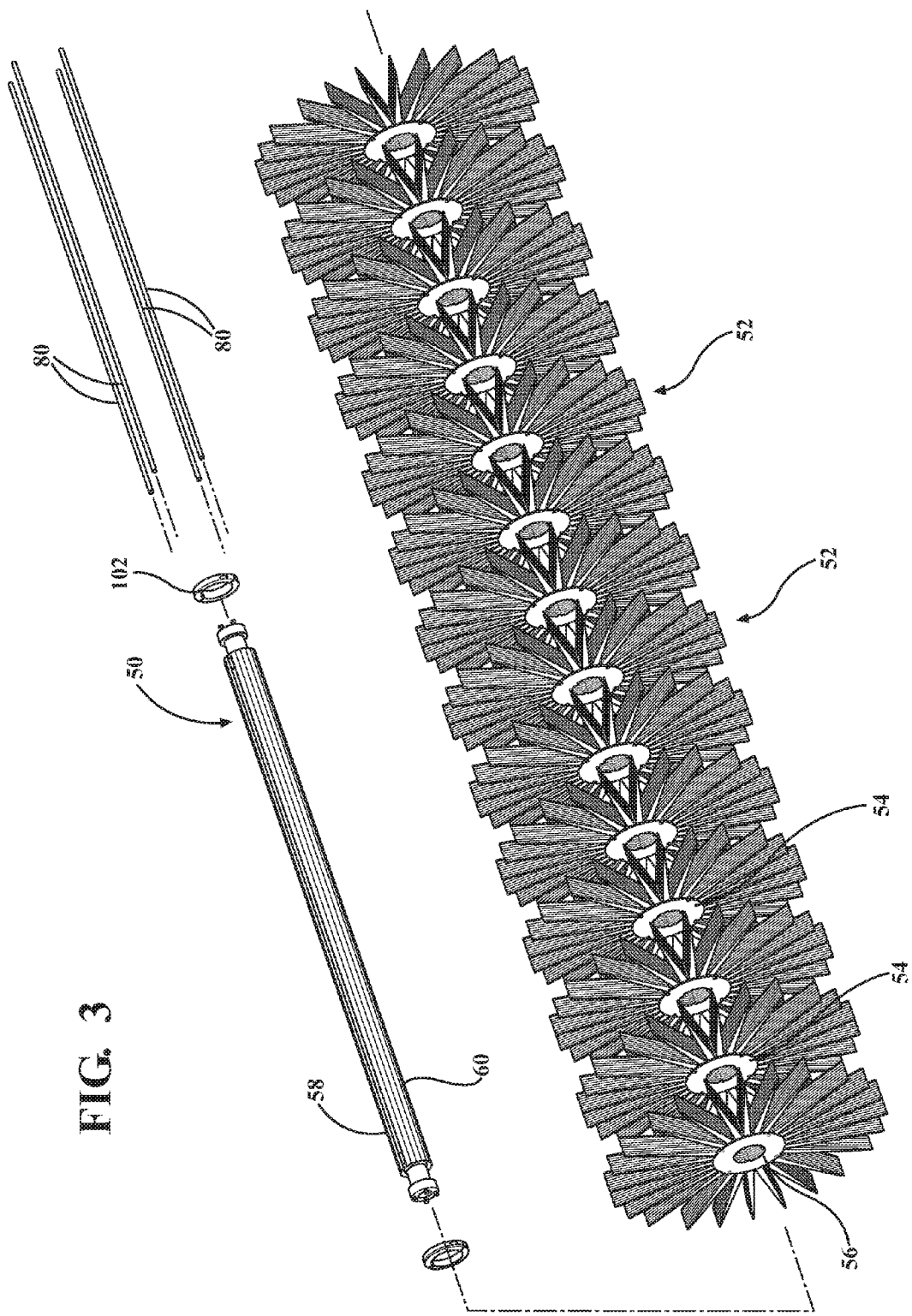
FIG. 3 is an exploded view of a lighted vehicle wash component in accordance with an aspect of the disclosure.

According to an aspect and as best illustrated in FIGS. 2 and 3, the hub portion 50 can generally extend between the first ends 42 of the pivotal arm portions 34, The hub portion 50 may be in communication with the drive mechanism 46 to effectuate rotation thereof, as will be understood by one of ordinary skill. According to another aspect, the hub portion 50 may include an outer surface 58 having a plurality of keyed structures $0 integrally formed thereon to effectuate driving of the media segments 52 as discussed in more detail below. The hub portion 50 may be formed of a metal material=However, it will be appreciated that the hub portion 50 may be formed of other suitable materials, such as plastic or the like. It will also be appreciated that the hub portion 50 may be formed from a variety of suitable forming processes. It will further be appreciated that the huh portion 50 could have a multitude of different configurations.

According to another aspect, the brush assembly 32 may include a plurality of individual separate wash media segments 52. It will be appreciated that more or less wash media segments may be employed. It will also be appreciated that the wash media segments 52 could have different shapes, sizes, and configurations.

Figure 5:
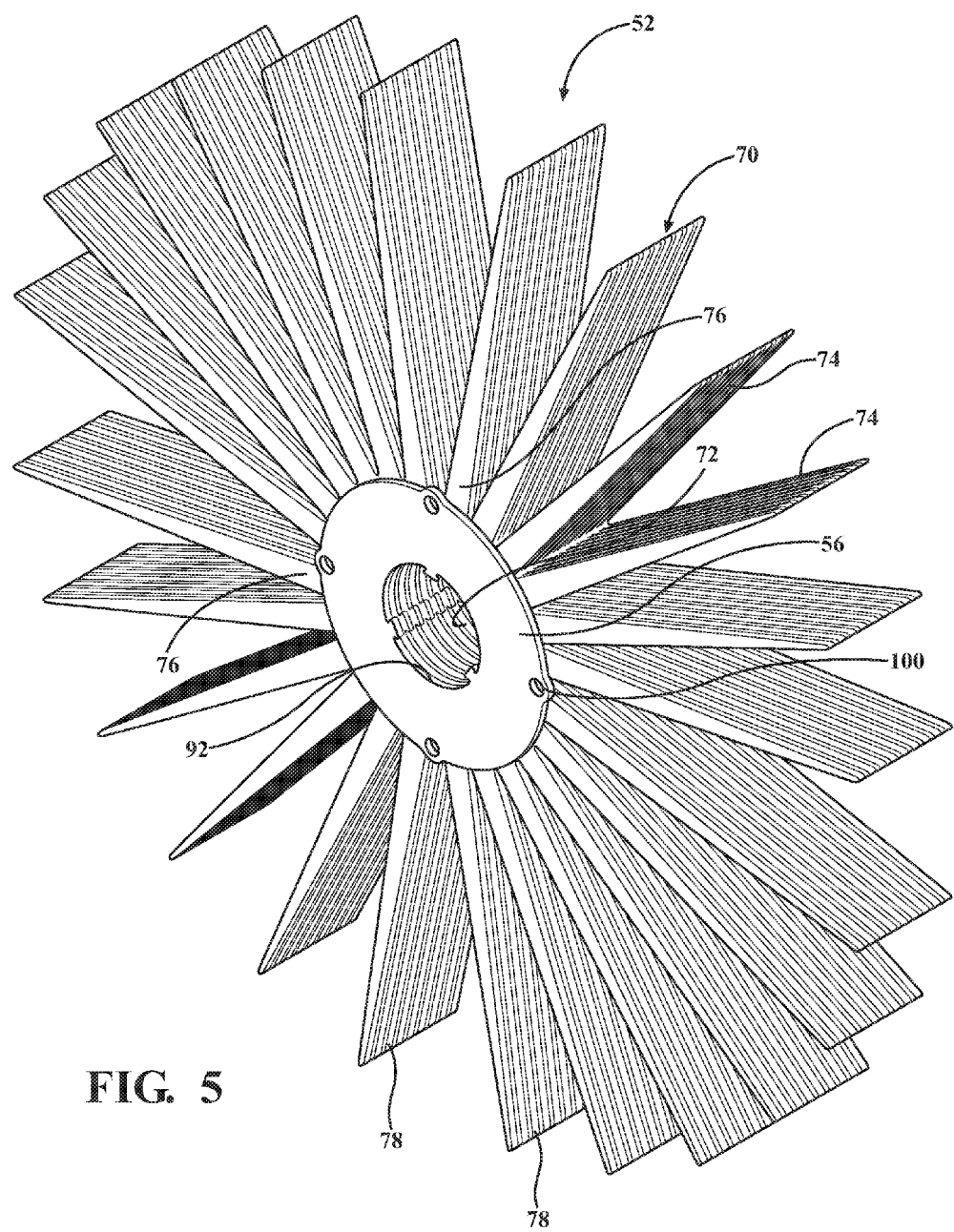
FIG. 5 is a perspective view of an exemplary wash media segment for a lighted vehicle wash component in accordance with an aspect of the disclosure.

FIGS. 5 through 7 best illustrate the exemplary configuration of a wash media segment 52. As shown and according to an aspect of the disclosure, each of the wash media segments 52 may include a media element 70 and a core portion 56. it will be appreciate that while this exemplary media segment is illustrated with a core portion 56, the core portion 54 could be readily substituted therefor as discussed in more detail herein. According to another aspect, the media element 70 may have a generally circular configuration with a central through hole 72 and a plurality of outwardly extending fingers 74 that are intended to contact and treat a vehicle exterior. Each of the extending fingers 74 could have an inner end 76 disposed adjacent the through hole 72 and an outer end 78 disposed remotely from the through hole 72. According to a still further aspect, the media elements 70 could be configured as a unitary structure that may be configured to slide over the hub portion 50 as a unitary element. It will be appreciated that each of the wash media segments and their media elements could have a variety of different configurations and shapes.

According to another aspect, the media elements 70 could be configured as individual strips that individually communicate with the hub portion 50 or the core portion. According to an aspect, the media elements 70 may be formed of conventional cloth material. According to another aspect, the media elements 70 may be constructed of a self-supporting material such as foam so that they substantially retain their shape at all times and do not droop or sag while the vehicle wash component 10 is at rest. It will be appreciated that the media elements may he formed of a variety of different materials and may have other suitable configurations.

In accordance with another aspect, the brush assembly 32 may include a plurality of illumination elements or light elements 80 interspersed amongst the media elements 70, According to another aspect, each of the plurality of light elements 80 may be disposed between adjacent rows of the plurality of media elements. According to one aspect shown in the drawings, the media elements 70 may be oriented on the hub portion 50 such that linear rows are created and whereby each of the light elements 80 may be oriented in a linear fashion between selected rows. As shown, four light elements 80 may be uniformly disposed around the outer surface 52 of the hub portion 50. It will be appreciated that more or less light sources may be employed. According to an aspect, the light elements 80 may be disposed on the brush assembly 32 so that light emitted from the light elements 80 may be visible from the exterior of the component 10 at all times, including when the component is rotating.

According to an aspect, the illumination elements 80 may be LED strips, consisting of individual LEDs that are connected through slip rings to a DC power source so as to emit light from the brush assembly 32 during brush operation. This can permit rotation of the illumination elements 80 with the rotation of the component 10, it will be appreciated that other types of suitable illumination elements 80 may also be utilized. According to an aspect, the lighted brush assembly can have an appearance that helps distinguish the wash location from competing sites that use rotary car wash brushes of conventional construction and non-illuminated hubs. In accordance with an aspect, pleasing aesthetic effects can be provided by illuminating the hub portion in one color or one set of colors and employing media elements of other colors such that the appearance of the brushes in for example, a conveyer wash is attractive and pleasing rather than intimidating and industrial. Also, the colors of the lights can be easily changed as can the colors of the media elements. Additionally, the illumination elements 80 can be configured to blink or have other effects to further enhance the aesthetically pleasing effect of the vehicle wash. Different colored illumination elements can be employed at the same time on the same or different components. The LEDs may be easily changed to modify the colors for different purposes. It will be understood that other illumination elements besides LEDs may be employed, Also, the location of the LEDs with the respect to the hub portion 50 may vary as required.

According to an aspect, FIGS. 8 through 10 illustrate exemplary core portions in accordance with an aspect of the disclosure. As shown, a first core portion 54 may have a generally circular shape. The first core portion 54 can include an outer perimeter 90 and an inner perimeter 92 defining a through hole 94. According to an aspect, the inner perimeter 92 can include a plurality of drive keys 96 formed therein that are designed to engage the keyed structures 60 formed in the outer surface 58 of the hub portion 50. The engagement of the drive keys 96 and the keyed structures 60 can effectuate rotation of the media elements 70 when the hub portion 50 is driven. According to another aspect, the outer perimeter 90 of the first core portion 54 can include a plurality of recesses 98 formed therein. The recesses 98 may be disposed adjacent an outer periphery of the first core portion 54. However, they may alternatively be disposed in other locations. According to a further aspect, the plurality of recesses 98 may be configured to receive a respective illumination element 80 therein so that it can rest therein while the hub portion 50 rotates so that the illumination elements 80 rotate as the hub portion 50 rotates. Each of the illumination elements 80 may be releaseably secured within each of the recesses 98 such that the illumination elements 80 may be easily removed and serviced or replaced as desired. According to an aspect, the first core portion 54 may be formed of a foam material that is relatively soft, It will be appreciated that the first core portion may be formed of a variety of other suitable materials.

FIG. 9 illustrates an exemplary second core portion 56 in accordance with another aspect of the disclosure. According to an aspect, the structure of the second core portion 56 may be the same as the structure of the first core portion 54 except for the configuration of the recesses. Instead of open recesses, the second core portion 56 can include a plurality of retaining holes 100, which may receive the light elements 80 therein and securely retain them. Again, the retaining holes 100 may each receive a respective illumination element 80 therein to securely retain it while the hub portion 50 rotates for rotation therewith. it will be appreciated that the illumination sources will need to be threaded through the plurality of retaining holes 100 instead of nested therein, The retaining holes 100 may be disposed adjacent an outer periphery of the second core portion 56. However, they may alternatively be disposed in other locations, Similarly, each of the illumination elements 80 may be releaseably secured within each of the retaining holes 100 such that the illumination 80 may be easily removed and serviced or replaced as desired. It will be appreciated that that the mechanism for retaining the illumination elements 80 may take on a variety of different configuration. According to a further aspect, a light source retaining mechanism may be integrally formed into the hub portion 50. It will be appreciated that the illumination elements 80 may be configured to extend along the length of the brush assembly 32. However, they could be configured to extend shorter lengths as desired.

Figure 4:
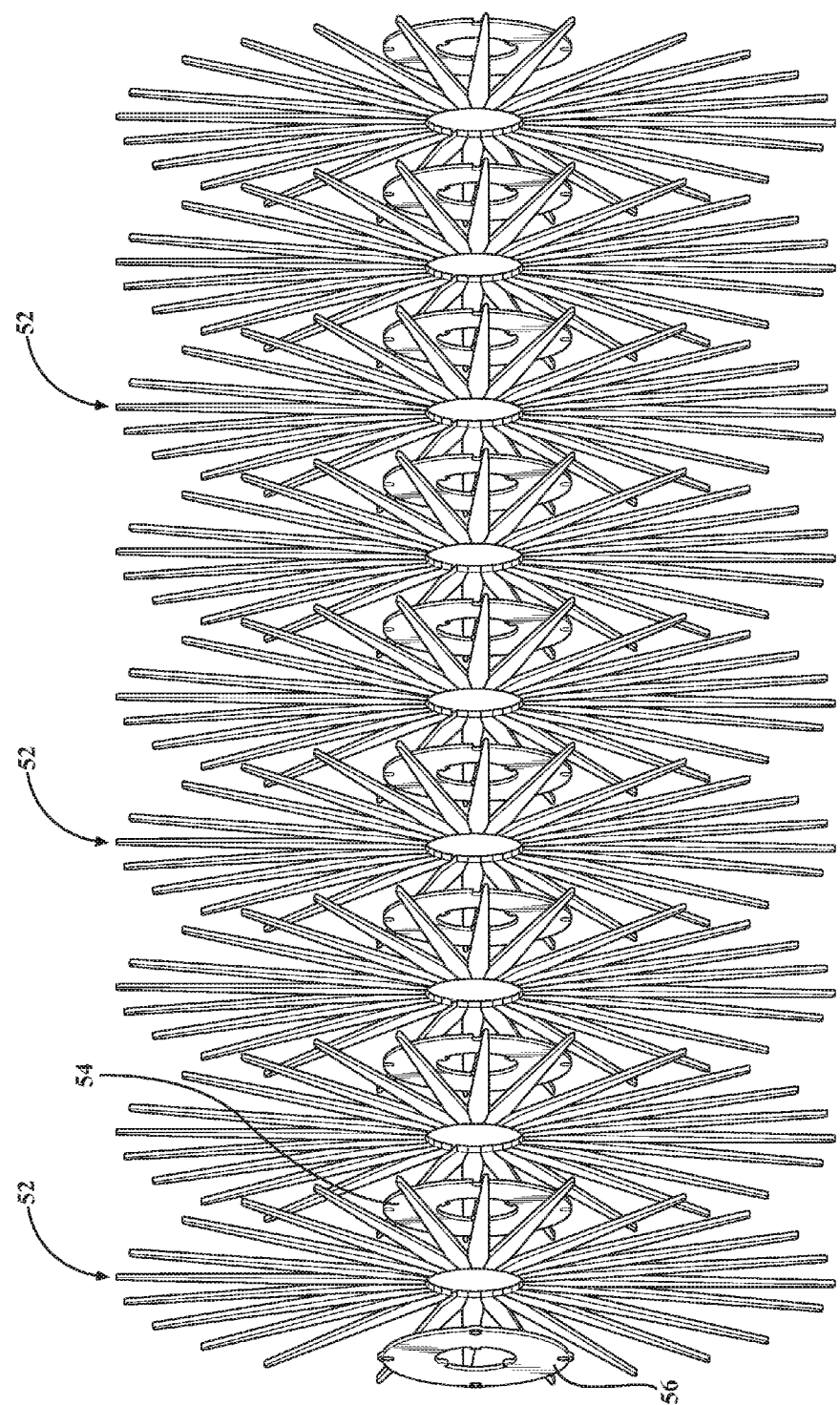
FIG. 4 is an exploded side view of a brush assembly of a lighted vehicle wash component in accordance with an aspect of the disclosure.

With reference to FIGS. 3 and 4, the brush assembly 32 can be formed from a plurality of wash media segments 52. According to an aspect, each of the wash media segments 52 may include a core portion 54, 56 disposed on either side thereof to secure and retain the media elements 70 for rotation. The media elements 70 can be retained for rotation with the core portion 54, 56 in a variety of suitable ways. The first core portion 54 and the second core portion 56 may be interspersed throughout the brush assembly 32 in order to secure the illumination elements 80. It will be appreciated that the respective number of first core portions 54 and the respective number of second core portions 56 may vary, In fact, all of one core portion configuration may be employed to the exclusion of the other.

According to an aspect, a plurality of wash media segments 52 may be arranged on a hub portion 50 such that the drive keys 96 on each of the core portions 54, 56 can engage the keyed structures 60 on the outer surface 58 of the hub portion 50. The media segments 52 may be retained on the drive hub 50 with securing rings 102 or a variety of other suitable mechanism. The illumination elements 80 may be secured to the brush assembly 32 by disposing them between rows of the media elements and securing them within the recesses 98 and/or retaining holes 100 of each of the core portions 54, 56.

According to an aspect, the illumination elements 80 may be disposed between adjacent rows of media elements such that they can be seen by vehicle occupants while the component 10 is operating. Additionally, the illumination elements 80 may be visible while the component 10 is at rest. According to another aspect, the illumination elements 80 can rotate with the component 10 so that they can emit light more broadly within the vehicle wash facility. The utilization of the disclosed lighted components can help brighten the environment within a vehicle wash facility to make it more inviting and less intimidating during a wash process. According to a further aspect, the environment can be brightened for vehicle occupants during the wash process by the emission of light that is visible thereto.

According to a further aspect, the utilization of illumination elements 80 in accordance with the present disclosure, which can be seen to vehicle occupants, can assist vehicle wash owners and operators in creating and promoting its brand. As different colored lights may be employed, which can be seen both within and outside the facility, the illumination elements 80 may be more effectively utilized to promote traditional vehicle wash services. The illumination elements 80 may also be employed to promote extra services, which may be offered over and above traditional or basic wash services.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle wash component, comprising:
a rotatable hub portion having an outer surface and an axis of rotation;
at least one core portion in driven communication with the rotatable hub portion;
a plurality of upstanding media elements in communication with the at least one core portion, which are configured to contact an exterior surface of a vehicle;
at least one light retainer in communication with the at least one core portion; and
at least one illumination element disposed between the plurality of upstanding media elements; the at least one illumination element received in the at least one light retainer so that the at least one illumination element can rotate as the at least one core portion rotates;
wherein the at least one illumination element is configured to be visible as the rotatable hub portion operates.

2. The vehicle wash component of claim 1, wherein the rotatable hub portion includes a plurality of keyed structures formed therein for engaging a plurality of drive keys formed on the at least one core portion to effectuate driving engagement thereof.

3. The vehicle wash component of claim 1, wherein the at least one core portion is constructed of a foam material.

4. The vehicle wash component of claim 3, wherein the at least one light retainer is an open recess.

5. The vehicle wash component of claim 1, wherein the at least one light retainer is disposed adjacent an outer periphery of the at least one core portion.

6. The vehicle wash component of claim 3, wherein the at least one light retainer is an aperture.

7. The vehicle wash component of claim 1, wherein the at least one illumination element is an LED strip.

8. The vehicle wash component of claim 1, wherein the at least one illumination element is disposed in the at least one light retainer by slideable engagement.

9. The vehicle wash component of claim 8, wherein the at least one illumination element extends in a substantially linear direction.

10. The vehicle wash component of claim 1, further comprising:
a plurality of illumination elements that are uniformly spaced about the perimeter of the rotatable hub portion between the plurality of upstanding media elements.

11. A rotary brush for a vehicle wash system, comprising:
a drive shaft having an axis of rotation;
a plurality of media core portions in driven communication with the drive shaft; the media core portions including a plurality of lighting component retaining features;
a plurality of wash media elements disposed along the axis of rotation and secured to the plurality of media core portions for rotation therewith, wherein the plurality of wash media elements consist of upstanding finger portions;
a plurality of illumination elements disposed between at least two of the upstanding finger portions, wherein the plurality of illumination elements are disposed within the plurality of lighting component retaining features so that they are secured to the brush for rotation therewith;
whereby the illumination elements are visible during rotation of the brush.

12. The rotary brush of claim 11, wherein the drive shaft includes a plurality of keyed structures formed therein for engaging a plurality of drive keys formed on the core portions to effectuate driving engagement thereof.

13. The rotary brush of claim 11, wherein each of the plurality of core portions is constructed of a foam material.

14. The rotary brush of claim 11, wherein each of the core portions have openings that are configured as open recesses.

15. The rotary brush of claim 11, wherein each of the core portions have openings that are configured as closed apertures.

16. The rotary brush of claim 11, wherein at least one of the illumination elements is an LED strip.

17. The rotary brush of claim 11, wherein each of the plurality of light component retaining features are configured as channels having at least one open end.

18. The rotary brush of claim 17, wherein the illumination elements are disposed in a respective open channel by slideable engagement.

19. The rotary brush of claim 11, wherein the light component retaining features are located adjacent an outer periphery of the core portions.

* * * * *